United States Patent
Kapusta

(10) Patent No.: US 11,061,813 B2
(45) Date of Patent: Jul. 13, 2021

(54) SYSTEMS AND METHODS FOR CHECKING CONSISTENCY OF REFACTORED METHODS

(71) Applicants: Atlassian Pty Ltd., Sydney (AU); Atlassian Inc., San Francisco, CA (US)

(72) Inventor: Dominik Kapusta, Gdansk (PL)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 16/690,067

(22) Filed: Nov. 20, 2019

(65) Prior Publication Data

US 2021/0149795 A1    May 20, 2021

(51) Int. Cl.
| | |
|---|---|
| G06F 9/44 | (2018.01) |
| G06F 11/36 | (2006.01) |
| G06F 16/23 | (2019.01) |
| G06F 11/07 | (2006.01) |
| G06F 21/55 | (2013.01) |

(52) U.S. Cl.
CPC ........ G06F 11/3692 (2013.01); G06F 11/073 (2013.01); G06F 11/3688 (2013.01); G06F 16/2365 (2019.01); *G06F 11/0751* (2013.01); *G06F 21/554* (2013.01)

(58) Field of Classification Search
CPC .. G06F 11/3612; G06F 16/9024; G06F 21/64; G06F 8/436; G06F 11/073; G06F 16/27; G06F 11/323; G06F 8/70; G06F 11/3692; G06F 11/3688; G06F 11/0751; G06F 21/554; G06F 16/2365; G06Q 10/103; H04L 43/0817
See application file for complete search history.

(56) References Cited

U.S. PATENT DOCUMENTS

| | | | | |
|---|---|---|---|---|
| 9,454,363 | B1* | 9/2016 | Angell | G06F 8/65 |
| 2008/0178161 | A1* | 7/2008 | Cates | G06F 11/3612 717/133 |
| 2008/0263105 | A1* | 10/2008 | Nakamura | H04L 43/0817 |
| 2010/0095128 | A1* | 4/2010 | Wilson | G06F 21/64 713/179 |
| 2014/0026118 | A1* | 1/2014 | Dangeville | G06F 8/70 717/121 |
| 2015/0314199 | A1* | 11/2015 | Chapman | G06Q 10/103 463/42 |

(Continued)

*Primary Examiner* — Tuan A Vu
(74) *Attorney, Agent, or Firm* — Brownstein Hyatt Farber Schreck, LLP

(57) ABSTRACT

Systems and methods for performing a consistency check test on a refactored method are disclosed. The method includes: at a computer, at execution time, receiving a refactored result generated by executing a refactored method and an old result generated by executing a corresponding original method associated with the refactored method; defining the refactored result generated by executing the refactored method as a first object and defining the old result generated by executing the original method as a second object; comparing the first object with the second object to identify any differences between the refactored result and the old result; and upon identifying one or more differences between the first object and the second object logging the differences in a log file.

15 Claims, 7 Drawing Sheets

(56) References Cited

U.S. PATENT DOCUMENTS

| | | | |
|---|---|---|---|
| 2016/0124725 A1* | 5/2016 | Drach | G06F 11/323 717/145 |
| 2016/0124796 A1* | 5/2016 | Marinet | G06F 11/073 714/37 |
| 2016/0179653 A1* | 6/2016 | Suzuki | G06F 8/436 717/126 |
| 2019/0220596 A1* | 7/2019 | Lie | G06F 16/9024 |
| 2019/0228020 A1* | 7/2019 | Sawatzky | G06F 16/273 |

* cited by examiner

300

■ Variation 1

Value
NEW

Name (optional)
NEW

■ Variation 2

Value
CHECK_RETURN_NEW

Name (optional)
CHECK_RETURN_NEW

■ Variation 3

Value
CHECK

Name (optional)
CHECK

■ Variation 4

Value
OLD

Name (optional)
OLD

SERVE   a percentage rollout

■ NEW                   0 %
■ CHECK_RETURN_NEW      0 %
■ CHECK                 10 %
■ OLD                   90 %

Fig. 3B

SYSTEMS AND METHODS FOR CHECKING CONSISTENCY OF REFACTORED METHODS

TECHNICAL FIELD

Aspects of the present disclosure are directed to testing of software systems and in particular to testing consistency of refactored methods in software systems.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Software systems or applications are continuously updated/changed, e.g., to include feature extensions or program enhancements and/or to fix bugs in the software application. Often updates are applied by changing or adding to an existing code base (which can span a few lines or millions of interconnecting lines of code) and the nature of the code base often makes a big difference on how easy or difficult it is to make these incremental changes. To make enhancements easier, code refactoring is often employed. This is a technique for restructuring an existing piece of code base, without changing its result and/or external behavior. For example, when developers need to add a new feature to a codebase, they may look at the existing code and consider whether it is structured in a manner that makes the new change straightforward. If it isn't, the developer may refactor the existing code before adding the new feature to make this new addition easy.

Code may also be refactored to improve the readability of the code and reduce complexity, which in turn may improve the maintainability of the code base. In other examples, code may be refactored to improve performance of the code base. Consider the example of a piece of software code in an issue tracking system, such as Jira, that sequentially loads issues from a database. It may be inefficient to load issues one-by-one. To rectify this, a developer may decide to refactor this piece of software code such that all active issues are loaded using one database call.

Although code refactoring has a number of advantages as describe above, it also has certain issues. For example, a developer may refactor a piece of software code to improve its readability or performance, but the refactoring may inadvertently affect the external behavior of the software system, causing one or more routines or subroutines that call that piece of code to return incorrect results. To address this, a number of tests (e.g., unit tests) are run on the refactored code base (to ensure routines still behave as expected) before releasing the new version of the code base to the production environment. Although comprehensive test cases may be checked before releasing the new version, some tests cases may inevitably be missed.

SUMMARY

Embodiments described herein may relate to, include, or take the form of a method for performing a consistency check test on a refactored method, the method including the operations of: at least at a computer, at execution time, receiving a refactored result generated by executing a refactored method and an old result generated by executing a corresponding original method associated with the refactored method; assigning the refactored result generated by executing the refactored method to a first object and assigning the old result generated by executing the original method to a second object; comparing the first object with the second object to identify any differences between the refactored result and the old result; upon identifying one or more differences between the first object and the second object logging the differences in a log file.

Some embodiments may include a configuration in which a method may be performed in response to a consistency check feature flag being identified by a product platform while executing instructions. In these examples, the consistency check feature flag meeting a condition for executing the consistency check test.

Some embodiments may include further include an operation of determining whether first and second objects are stored in the same location in memory. Upon determining that first and second objects are not stored in the same location, a method can advance to an operation of determining whether the value of a first object matches the value of a second object.

Some embodiments may include further an operation of at least identifying a class of a first object and a class of a second object, comparing the class of the first object with the class of the second object to determine if the classes match, and upon determining that the classes of the first and second objects do not match, determining whether the first object or the second object may be flagged to be ignored, and upon determining that the first object or the second object may be not flagged to be ignored, logging the class difference in the log file.

Some embodiments may include an operation in which at least upon determining that the classes of first and second objects match, determining the type of class, and if the type of class may be determined to be a primitive class, an array, a list or a set, determining whether the values of the first and second object match.

Some embodiments may include an operation triggered upon determining that the classes of first and second objects match, determining the type of class, and if the type of class may be determined to be a map, retrieving one or more map keys from first object and the second object, comparing the retrieved map keys from first object and the second object to determine if one or more pairs of the retrieved map keys match, upon determining that one or more pairs of the retrieved map keys do not match, determining whether the one or more pairs of the retrieved map keys are flagged to be ignored, and upon determining that the one or more pairs of the retrieved map keys are not flagged to be ignored, logging the difference in the one or more pairs of the retrieved map keys in the log file.

Some embodiments include an operation triggered upon determining that the one or more pairs of the retrieved map keys match, selecting an unprocessed key from the first object, retrieving values for the selected key from the first object and the second object and assigning the value retrieved for the selected key from the first object to a first variable and assigning the value retrieved for the selected key from the second object to a second variable, and comparing the first variable and the second variable to determine if the first variable and the second variable match, and upon determining that the first variable and the second variable do not match, determining whether the first variable or the second variable may be flagged to be ignored, and upon determining that the first variable or the second variable may be not flagged to be ignored, logging the difference in the first variable and the second variable in the log file.

Some embodiments may include further include an operation triggered upon determining that the classes of the first and second objects match, determining the type of class, and if the type of class may be determined to not be a map, retrieving one or more fields from first object and the second object, selecting a field from the first object, retrieving values for the selected field from the first object and the second object and assigning the value retrieved for the selected field from the first object to a first variable and assigning the value retrieved for the selected field from the second object to a second variable, and comparing the first variable and the second variable to determine if the first variable and the second variable match, and upon determining that the first variable and the second variable do not match, determining whether the first variable or the second variable may be flagged to be ignored, and upon determining that the first variable or the second variable may be not flagged to be ignored, logging the difference in the first variable and the second variable in the log file.

Some embodiments may include instructions which when executed by the processor cause the computing device to perform a described method in response to a consistency check feature flag being identified by a product platform while executing instructions, and the consistency check feature flag meeting a condition for executing the consistency check test.

Some embodiments may include instructions which when executed by a processor cause an associated computing device to determine whether first and second objects are stored in the same location in memory, and upon determining that the first and second objects are not stored in the same location, determine whether the value of the first object matches the value of the second object.

Some embodiments include instructions which, when executed by a processor, cause a computing device to identify a class of the first object and a class of the second object, compare the class of the first object with the class of the second object to determine if the classes match, and upon determining that the classes of the first and second objects do not match, determine whether the first object or the second object may be flagged to be ignored, and upon determining that the first object or the second object may be not flagged to be ignored, log the class difference in the log file.

In some embodiments, a non-transitory machine readable medium stores instructions which, when executed by a processor, cause a computing device to: upon determining that the classes of the first and second objects match, determine the type of class; and if the type of class may be determined to be a primitive class, an array, a list or a set, determine whether the values of the first and second object match.

In some examples, instructions which when executed by a processor cause a computing device to: upon determining that the classes of the first and second objects match, determine the type of class; and if the type of class may be determined to be a map, retrieve one or more map keys from first object and the second object; compare the retrieved map keys from first object and the second object to determine if one or more pairs of the retrieved map keys match; upon determining that one or more pairs of the retrieved map keys do not match, determine whether the one or more pairs of the retrieved map keys are flagged to be ignored; and upon determining that the one or more pairs of the retrieved map keys are not flagged to be ignored, log the difference in the one or more pairs of the retrieved map keys in the log file.

Some embodiments recite instructions which, when executed by a processor, cause a computing device to, upon determining that the one or more pairs of the retrieved map keys match, select an unprocessed key from the first object, retrieve values for the selected key from the first object and the second object and assign the value retrieved for the selected key from the first object to a first variable and assign the value retrieved for the selected key from the second object to a second variable, and compare the first variable and the second variable to determine if the first variable and the second variable match, and upon determining that the first variable and the second variable do not match, determine whether the first variable or the second variable may be flagged to be ignored, and upon determining that the first variable or the second variable may be not flagged to be ignored, log the difference in the first variable and the second variable in the log file.

Some embodiments include instructions which when executed by a processor cause a computing device to determine whether more unprocessed keys are present in the first object, and upon determining that one or more unprocessed keys are present, repeat the steps of claim 8 for each unprocessed key present in the first object.

Some embodiments include instructions which when executed by a processor cause a computing device to upon determining that the classes of the first and second objects match, determine the type of class, and if the type of class may be determined to not be a map, retrieve one or more fields from first object and the second object, select a field from the first object, retrieve values for the selected field from the first object and the second object and assign the value retrieved for the selected field from the first object to a first variable and assign the value retrieved for the selected field from the second object to a second variable, and compare the first variable and the second variable to determine if the first variable and the second variable match, and upon determining that the first variable and the second variable do not match, determine whether the first variable or the second variable may be flagged to be ignored, and upon determining that the first variable or the second variable may be not flagged to be ignored, log the difference in the first variable and the second variable in the log file.

Some embodiments relate to instructions which, when executed by a processor, cause the computing device to determine whether more unprocessed fields are present in the first object, and upon determining that one or more unprocessed keys are present, repeat the steps of claim 19 for each unprocessed field present in the first object.

BRIEF DESCRIPTION OF THE DRAWINGS

FIG. 3A illustrates an example consistency check feature flag according to one or more embodiments of the present disclosure.

FIG. 3B is an example user interface illustrating customized target rules for the example consistency check feature flag of FIG. 3A.

Figure 1:
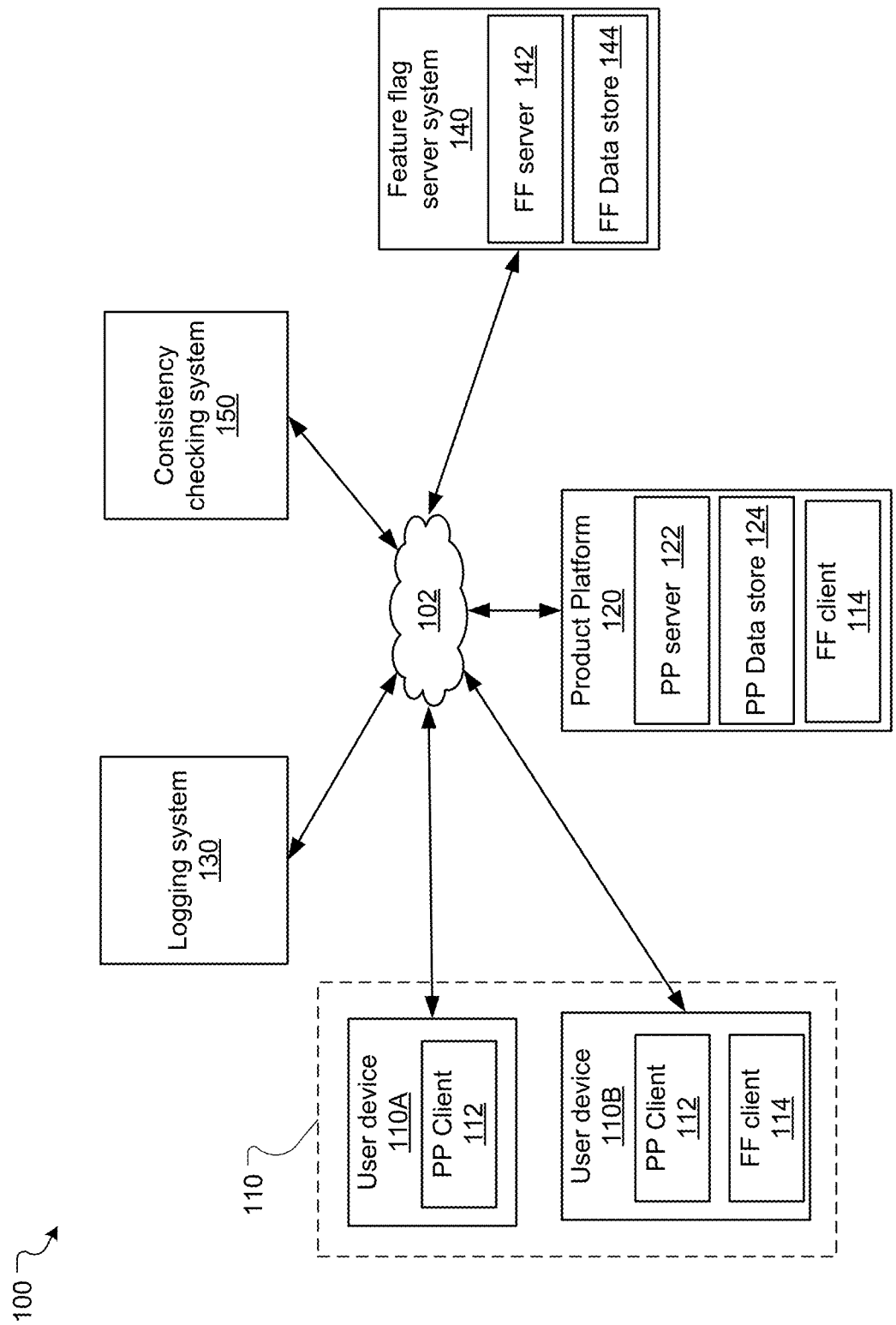
FIG. 1 is a block diagram illustrating a network environment in which aspects of the present disclosure may be implemented.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

Overview

In the following description, for the purposes of explanation, numerous specific details are set forth to provide a thorough understanding of the present invention. It will be apparent, however, that the present invention may be practiced without these specific details. In some instances, well-known structures and devices are shown in block diagram form to avoid unnecessary obscuring.

In recent decades, a number of software development best practices have emerged. One such practice is the use of feature flags (also referred to as, for example, feature toggles, feature switches, conditional features). For ease of reference, the acronym FF will be used herein in place of "feature flag".

A given FF relates to deployed source code, which (on execution) provides one or more features in a software product. As used in this disclosure, the term feature refers to a unit of functionality offered by a software application that is either visible to users (e.g., a behavior of a software application in response to a user input, etc.) or not visible to users (e.g., a background task that removes unnecessary records from a database).

In its simplest form, a FF essentially provides a conditional logic wrapper to the feature that enables the feature to be switched on (i.e. made available) or off (i.e. made unavailable). For example, when a FF is set to true, the software product when executed makes the feature(s) associated with that flag available. Conversely, when a FF is set to false, the software product when executed makes the feature(s) associated with that flag unavailable. This provides software developers the ability to control whether features included in a deployed/released code base are available or unavailable to customers (i.e., end users of the software product).

In addition to simple Boolean values (i.e., true or false) which allow a feature to be switched on or off, multivariate FFs can also be provided, which can allow different variations of a feature to be made available or unavailable. For example, if a software team has created two variations of an original feature—e.g., a new version A and a new version B, then the software team may be able to provide new version A of the feature to some target users, new version B of the feature to some other target users, and the old version of the feature to the rest of their target users. In this manner, developers can assess the performance of the different versions of a feature before determining which version of the feature they would like to roll out to their customer base.

FFs are often also used to roll out a code refactoring, which as described previously, is the process of restructuring existing software code, i.e., changing the factoring of the code, without changing its results, e.g., to improve code readability, simplify code structure, improve performance, extensibility, etc. In this case, the developer could use a FF to progressively switch from the old method to the refactored method. As used in this disclosure, the term method refers to a function or a block of code that performs a specific task.

In this disclosure, the term old feature or original feature refers to a feature that is provided when the original or old code is compiled and executed and the term refactored feature refers to the feature that is provided when the refactored code is compiled and executed.

The use of FFs provides a number of advantages. For example, FFs allow software developers granular control over how a given feature is actually made available to customers. Using a FF, delivery of a feature may be controlled, for example, to specific customers, customers in a specific user tier, customers in a particular geographic region, customers with a particular product configuration, or a set number/percentage of random customers. This allows for software testing and user acceptance testing by a selected group or segment of customers before the new feature is rolled out to a wider customer base. As another example, where availability of a feature is controlled by a FF, the feature can easily be rolled back (made unavailable) in the event that customer feedback is sufficiently negative or an issue with the feature is identified.

Various software products/systems have been developed to assist with using FFs—for example LaunchDarkly® and Rollout®. For ease of reference, products/systems such as these will be referred to as FF systems. Generally speaking, FF systems provide mechanisms for creating FFs and controlling the roll out and roll back of features enabled by FFs. In LaunchDarkly, for example, roll out of a feature is controlled by customizable target rules, which dictate when, and to what users/user groups, features behind FFs are made available. The rules associated with active FFs may be forwarded to the computing system (server and/or user device) that is configured to execute the software application such that the computing system can determine based on the rules associated with a FF which version of the feature to provide when the feature is invoked.

Embodiments of the present disclosure are directed to systems and methods for utilizing multivariate FFs in the underlying code base to perform consistency checks on a piece of refactored code and to alert the developer/team responsible for the corresponding refactored code if the result of the refactored code is different from the result of the old code.

In particular, when developers refactor a piece of code (e.g., corresponding to a method), they can wrap the old version of the method and the refactored version of the method in a multivariate FF. The multivariate flag can be designed such that two variations of the FF execute either the old method or the refactored method. One or more additional variations can be defined, which when executed, cause a consistency check test to be performed on the refactored method.

Generally speaking, a consistency check test is a test performed to determine if results (including data structures) returned by execution of the old method and results returned by execution of its refactored version have any internal conflicts. Put another way, a consistency check test is the technique by which method calls to any given method is captured and replayed against the refactored version of the method. This can happen either in real time where an incoming method call is bifurcated and routed to both the old method and the refactored method, or it could happen asynchronously when a copy of the previously captured method call is replayed against the refactored method.

Each variation of the FF can then be programmed with customizable target rules. When the target rules for running the consistency check variation are met, the presently disclosed systems and methods can compare the result of the old method and the refactored method at runtime to determine whether the result of the refactored is the same as that of the old method. In order to perform this comparison, a consistency checking system is provided. This consistency checking system receives the results of executing the original/old method and the corresponding refactored method. The result can typically include one or more (simple or complex) objects and their corresponding values. For instance, in the example of a method in an issue tracking system, such as Jira, that loads issues from a database, the result of the old method and the refactored method may be a list of all active issues in the database (which could include thousands of active Jira issues). The consistency checking system can compare the results at runtime to determine if there are any differences. If differences are identified (e.g., because the list of active issues retrieved by executing the two pieces of code do not match), the consistency check test is considered a failure, and the differences are logged. Alternatively, if no differences are identified, the consistency check test is considered a success, and the consistency checking system 150 determines that the refactored method performs consistently with the original method.

Further, for failed consistency checks, the disclosed systems and methods return the result of the executed old method to the customer. Because the systems and methods disclosed herein revert to the old method if any errors are discovered, the customer is not affected by the errors in the refactored method. Alternatively, for successful consistency checks, the disclosed systems and methods can provide the result of the executed refactored method to the customer. In certain embodiments, the consistency check test may be executed inside a try-catch block to account for any harmful exceptions that may potentially be returned by the refactored method. In case an exception occurs when executing the refactored method, the exception is logged, the result of the old method is returned and the end user is not affected by the exception.

At the end of a predetermined testing period (e.g., a week or a month), if it is determined that the consistency check test has always been successful, it can be concluded that the refactored method is working as expected, the old method (and corresponding code) can be disabled and later removed, and the refactored method (and corresponding refactored code) can be rolled out to the entire customer base.

By using the presently disclosed systems and methods developers can compare the old and refactored methods without writing complex code for comparing the results of these methods. Instead, this operation is performed automatically by the disclosed consistency checking system, which can easily compare simple as well as complex data structures.

An overview of one example environment illustrating different systems involved in certain embodiments will be described, followed by a description of a computer system, which can be configured in various ways to perform the embodiments/various features thereof as described herein. Operations for performing a consistency check test will then be described.

Environment Overview

FIG. 1 illustrates an example environment 100 in which embodiments and features of the present disclosure are implemented. In particular, FIG. 1 illustrates the systems and platforms that may be utilized to check the consistency of a refactored piece of code. Example environment 100 includes a communications network 102, which interconnects one or more user devices 110, a product platform 120, a feature flag system 140, a logging system 130 and a consistency checking system 150.

In general, the product platform 120 is a system entity that hosts one or more software applications and/or content. The platform 120 may include one or more servers 122 for hosting corresponding software application(s) and one or more storage devices 124 for storing application specific data. Examples of software applications hosted by product platforms 120 may include interactive chat applications (e.g., Slack™), collaborative applications (e.g., Confluence™), software code management systems (e.g., Bitbucket™), and issue tracking applications (e.g., Jira™). Jira, Confluence, and BitBucket, are offered by Atlassian, Inc. It will be appreciated that the software applications need not be offered by the same organization and that the presently disclosed invention can be used with any product platform.

In order to run a particular application, the product platform server 122 includes one or more application programs, libraries, APIs or other software elements that implement the features and functions of the application. For example, in case the product platform 120 is an issue tracking system such as Jira, the server 122 allows users to perform various actions with respect to issues—for example, create issues, associate issues with projects and/or other issues, transition issues between workflow states, add/edit information associated with issues, assign issues to specific people/teams, view issues and/or search for issues. The issue tracking system also allows for management of an issue, for example user permissions defining: users that can see an issue and its associated information; users who can edit an issue; users who can transition an issue into/out of a particular workflow state; users who should be automatically notified any time an issue changes (either any change or a particular change), etc.

While single server architecture has been described herein, it will be appreciated that one or more of the product platform server 122 can be implemented using alternative architectures. For example, in certain cases a clustered architecture may be used where multiple server computing instances (or nodes) are instantiated to meet system demand. Conversely, in the case of small enterprises with relatively simple requirements a product platform 120 may be a stand-alone implementation (i.e. a single computer directly accessed/used by the end user).

The product platform server 122 may be a web server (for interacting with web browser clients) or an application server (for interacting with dedicated application clients). While the product platform 120 has been illustrated with a single server 122, in some embodiments it may provide multiple servers (e.g. one or more web servers and/or one or more application servers).

The FF system 140 (as described previously) provides mechanisms for creating FFs and controlling the roll out and roll back of features enabled by FFs. Further, the FF system 140 may communicate the rules associated with active FFs to the product platform 120 such that the product platform 120 can execute the correct variation of the multivariate FF at execution time based on the FF rules. In addition to this, in some cases, the FF system 140 may receive event log data from the product platform 120 related to the usage of the FFs during execution. This log data may include, e.g., a count of the number of times the FF was invoked and the state of the FF each time it was invoked within a given period and/or operating environment.

In order to perform these functions, the FF system 140 includes a FF server 142 and a FF data store 144. The FF server 142 configures the FF server system 140 to provide server side functionality—e.g. by receiving and responding to requests from FF clients (e.g. client 114) and storing/retrieving data from the FF data store 144 as required. The FF data store 144 stores the information related to FFs. This information may include, e.g., for each FF, a unique identifier for the FF, a FF name, the rules associated with the FF, the owner of the FF and/or any other users/developers associated with the FF.

Further still, the FF system 140 may require an organization associated with the product platform 120 to register a product account and developer accounts with the FF system 140 such that any FFs created by developers from the organization can be associated with the developer that created the FF and with the corresponding product platform 120. The product and developer account information is also stored in the FF data store 144.

The FF server 142 may be a web server (for interacting with web browser clients) or an application server (for interacting with dedicated application clients). While FF server system 140 has been illustrated with a single server 142 it may provide multiple servers (e.g. one or more web servers and/or one or more application servers).

In certain embodiments, FF server system 140 is a scalable system including multiple distributed server nodes connected to the shared data store 144 (e.g. a shared file server). Depending on demand from clients (and/or other performance requirements), FF server system 140 server nodes can be provisioned/de-provisioned on demand to increase/decrease the number of servers offered by the FF server system 140. Each FF server 142 may run on a separate computer system and include one or more application programs, libraries, APIs or other software that implement server-side functionality. Similarly, FF data store 144 may run on the same computer system as a FF server 142, or may run on its own dedicated system (accessible to FF server(s) 142 either directly or via a communications network).

The user device 110, e.g., user device 110A may be utilized by consumers to access the product platform 120. Further, the user device 110, e.g., user device 110B may be utilized by developers from time to time to refactor software code of a software application offered by the product platform 120, e.g., to improve the readability, extensibility, maintainability or performance of a piece of the software code.

When the user device 110 is utilized by a consumer of the product platform 120, the user device 110 has a product platform client 112 installed and/or executable thereon. The user device 110 may also have other applications installed/running thereon, for example, an operating system and a source code management/development client.

When executed by the user device 110, the product platform client 112 configures the user device 110 to provide client-side product platform functionality. This involves communicating (using a communication interface such as 218 described below) with the product platform 106. The product platform client 114 may be a dedicated application client that communicates with the product platform 120 using an API. Alternatively, the product platform client 112 may be a web browser (such as Chrome, Safari, Internet Explorer, Firefox, or an alternative web browser) which communicates with the product platform 120 using http/https protocols.

When the user device 110B is utilized by a developer to refactor pieces of software code of a software application offered by the product platform 120, the user device 110 includes a FF client 114 in addition to the product platform client 112. The FF client application 114 configures the user device 110 to provide client-side FF system functionality. This involves providing a communication interface between the user device 110 and the FF system 140 (and, in particular, the FF server 142). In some examples, the FF client 114 may provide an interface for a developer to create a new FF or manage an existing FF. In addition, the FF client 114 may communicate with the FF server 140 to allow a developer to view the performance of a FF, for example. The FF client 114 may be a dedicated application client that communicates with the FF server 142 using an API. Alternatively, FF client 114 may be a web browser, which communicates with a FF web server using http/https protocols.

While user device 110B has been shown with separate product platform client and FF client 112 and 114, a single application may be used as both product platform client and FF client (e.g. a web browser, in which case the product platform and FF servers are web servers).

User device 110 may be any form of computing device. Typically, user device 110 is a personal computing device—e.g. a desktop computer, laptop computer, tablet computer, and in some instance even a mobile phone. While only two user devices 110 have been illustrated, an environment would typically include multiple user devices 110 used by consumers for interacting with the product platform 120 and multiple user devices used by developers for updating software applications hosted by the product platform 120 and creating/managing FFs using the FF system 140.

The product platform 120 and the product platform client 112 (running on the user device 110) operate together to provide the functionality offered by the product platform 120. For example, consumers may utilize the product platform client 112 to access and/or interact with the products/services offered by the product platform 120. Similarly, the FF server 142 (running on FF system 140) and FF client 114 (running on user device 110) operate together to provide FF system functionalities. For example, the FF server 142 and the FF client 114 may operate together to allow a developer to create a new FF, manage a FF, create an account, etc.

The logging system 130 stores event log data associated with the product platform 120. For example, each time a user device 110 interacts with a product/service offered by the product platform 106, the product platform may generate an event log and forward the event log for storing in the logging system 130. The event log may include e.g., the time of the interaction, the particular type of interaction, a user ID of the user attempting the interaction (if available), status of the interaction (e.g., successful, unsuccessful), etc. The product platform 120 can configure the type of event data that it captures and stores. Further, the product platform 120 can configure the frequency at which it captures and stores event data. For example, in some cases the product platform 120 may only capture and store event data for failures and/or if an operation takes longer than a threshold time to execute or times out. In other cases, the product platform may only capture and store event data for a small percentage of interactions (e.g., one in every 1000, one in every 100, etc.).

Examples of event log data include application logs (i.e., a log of each time an application is accessed), and performance data logs (e.g., a log of the state of the CPU, disk, memory, etc., when an application is accessed).

In addition to this, the logging system 130 stores log data associated with active FFs in the executed code and with consistency check tests performed by the consistency checking system 150. For example, if on execution a particular user action, the product platform server 122 or client 112 encounters a FF, the event log data may include a unique identifier of the FF, a state of the FF (e.g., variation 1, variation 2, etc.), and any performance data related to execution of the feature(s) corresponding to the FF.

In case a consistency check test is performed, the consistency checking system 150 may forward a consistency check log to the logging system 130. In some examples, the consistency check log includes a result of the consistency check test—i.e., whether the corresponding refactored method passed the consistency check. If the refactored method in any particular instance fails to pass the consistency check, the consistency check log also includes a list of the differences that caused the failure.

A simplified example of a consistency check log is shown in Table A below.

TABLE A

Example consistency check log

Consistency check 'my-ff' failed. Unequal ['K'].[2].dynamicField: "XXX" != "YYY"

Table A: Example consistency check log
The example consistency check log depicted in table A includes:
- A consistency check ID which is a unique identifier for the consistency check test being performed. In this case, the consistency check ID is 'my-ff', which corresponds to the name of the FF used for the consistency check.
- Status, which indicates the status of the test—success or failed. In this example, the test has failed.
- List of errors, which include all the errors identified by the consistency check test. In this example, both the old and refactored method returned a map object. The test identified that the $2^{nd}$ position in the lists contained in the given maps under the key 'K' there was an object with a field called "dynamic field". The values of that field did not match in the old and refactored methods' results.

The consistency checking system 150 can configure the type of consistency check data that it captures and stores in the logging system 130 for refactored methods. For example, the consistency checking system 150 may log a threshold number of differences (e.g., 100). Further, the consistency checking system 150 can configure the frequency at which it captures and stores event data. For example, in some cases the consistency checking system 150 may only capture and store event data for consistency check failures. In other cases, the consistency checking system 150 may only capture and store consistency checking data for a small percentage of events (e.g., one in every 1000, one in every 100, etc.).

One example of a logging system is Splunk®. However, the embodiments described herein are not limited to be used with Splunk and can be used with any other data logging system or database. In certain embodiments, the logging system 130 indexes the log data before storing so that the log data can be easily searched and retrieved. Further, in these embodiments, the logging system 130 includes a search engine (not shown) which may be queried to retrieve data logs.

The consistency checking system 150 is invoked whenever a consistency check variation of a multivariate FF is activated. Once invoked, it performs a consistency check test on the refactored piece of code wrapped in the FF by comparing results of the original method and the refactored methods. To this end, the product platform 120 communicates with the consistency checking system 150 to forward runtime results of the original and refactored methods. The consistency checking system 150 also communicates with the logging system 130 to store a consistency check log of the test including any differences between the results of the original method and the refactored method identified during the test. Further, during a consistency check test, the system 150 maintains a test record and the consistency check log. The test record and consistency check log may be stored in a local cache (not shown) operated by the consistency checking system 150 during the test. Once the test is completed, the test record may be deleted whereas the consistency check log may be forwarded to the logging system 130 if it meets logging rules. Operations of the consistency checking system 150 will be described in detail with reference to FIGS. 3 and 4.

In FIG. 1, the consistency checking system 150 is illustrated as a system separate from the product platform 120. However, in some embodiments, the consistency checking system 150 may be executed by the product platform 120 and in these embodiments, the consistency checking system 150 may form a part of the product platform 120 itself.

Communications between the various systems in environment 100 are via the communications network 102. Communications network may be a local area network, public network (e.g. the Internet), or a combination of both.

While environment 100 has been provided as an example, alternative system environments/architectures are possible.

Hardware Overview

The embodiments and features described herein are implemented by one or more special-purpose computing systems or devices. For example, in environment 100 each of the user device 110, the product platform 120, the logging system 130, the FF system 140, and/or the consistency checking system 150 is or includes a type of computing system.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further, alternatively, a special-purpose computing system may include one or more general-purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 2:
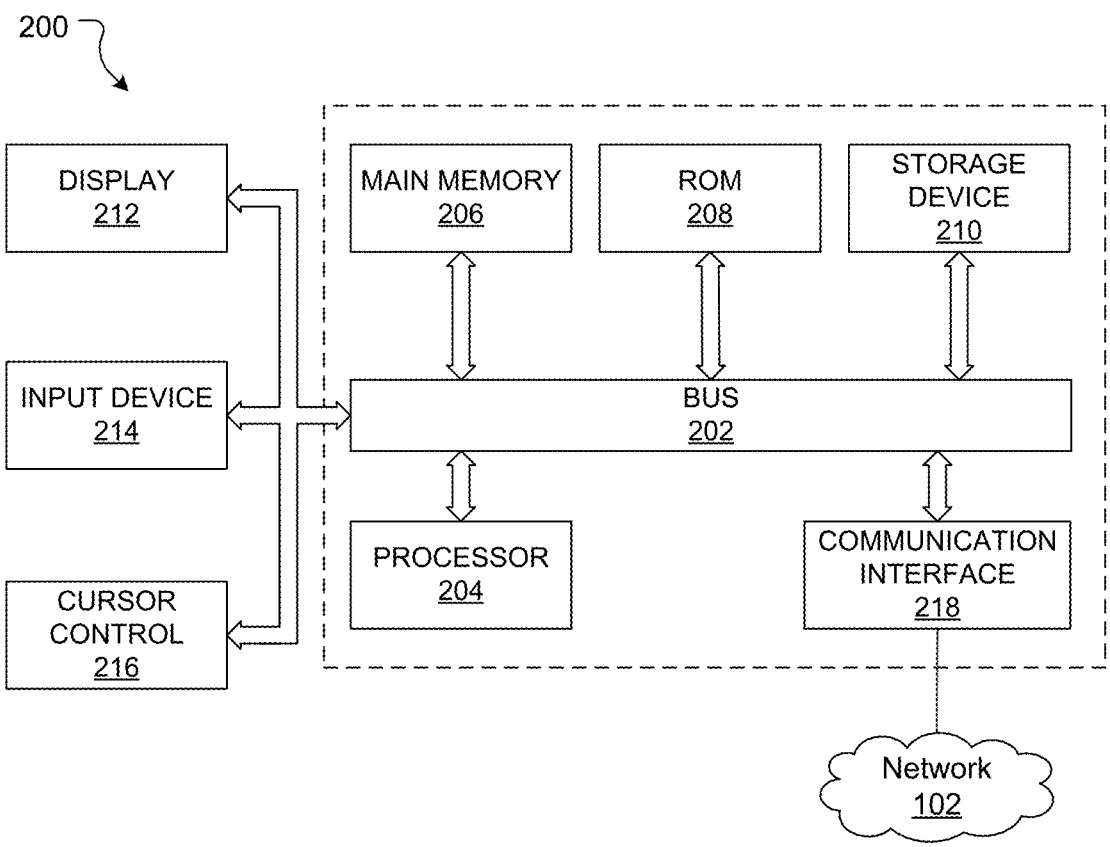
FIG. 2 is a block diagram of a computing system with which various embodiments of the present disclosure may be implemented.

By way of example, FIG. 2 provides a block diagram that illustrates one example of a computer system 200, which may be configured to implement the embodiments and features described herein. Computer system 200 includes a bus 202 or other communication mechanism for communicating information, and a hardware processor 204 coupled with bus 202 for processing information. Hardware processor 204 may be, for example, a general-purpose microprocessor, a graphical processing unit, or other processing unit.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

In case the computer system 200 is the user device 110, the computer system 200 may be coupled via bus 202 to a display 212 (such as an LCD, LED, touch screen display or other display), for displaying information to a computer user. An input device 214, including alphanumeric and other keys, may be coupled to the bus 202 for communicating information and command selections to processor 204. Another type of user input device is cursor control 216, such as a mouse, a trackball, or cursor direction keys for communicating direction information and command selections to processor 204 and for controlling cursor movement on display 212.

According to one embodiment, the techniques herein are performed by computer system 200 in response to processor 204 executing one or more sequences of one or more instructions contained in main memory 206. Such instructions may be read into main memory 206 from another storage medium, such as a remote database. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio wave and infrared data communications.

Computer system 200 also includes a communication interface 218 coupled to bus 202. Communication interface 218 provides a two-way data communication coupling to a communication network, for example communication network 102 of environment 100. For example, communication interface 218 may be an integrated services digital network (ISDN) card, cable modem, satellite modem, etc. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Computer system 200 can send messages and receive data, including program code, through the network(s) 102, network link 220 and communication interface 218.

As noted, computer system 200 may be configured in a plurality of useful arrangements, and while the general architecture of system 200 may be the same regardless of arrangements, there will be differences. For example, where computer system 200 is configured as a server computer (e.g. such as product platform 120, logging system 130, FF system 140, or consistency checking system 150), it will typically be provided with higher end hardware allowing it to process data, access memory, and perform network communications more rapidly than, for example, a user device (such as device 110).

The various systems and platforms depicted in FIG. 1 communicate with the other systems in network 100 via suitable communication networks 102. For example, the user devices 110 may communicate with the product platforms 120 via public networks, whereas the consistency checking 150 may communicate with the product platform 120 and/or the logging system 130 via one or more private or public networks. It will be appreciated that based on the required implementation, any suitable communication networks 102 may be utilized to allow communication between the systems in environment 100.

Consistency Checking Process

Over time, different types of programming languages have been developed to write software systems. One type of programming language is object-oriented programming (OOP), which is based on the concept of "objects". Each object in OOP includes data in the form of fields (often known as attributes or properties of the object) and code in the form of procedures (often known as methods performed on or by the objects). OOP is also often class-based, meaning that objects are instances of classes, which also determine their types. Some widely used OOP languages include Java, Python, JavaScript and Ruby.

The process for determining the consistency of refactored method is described in this disclosure using an OOP language as an example and more particularly using Java® programming language as an example. However, it will be appreciated that the described consistency checking processes can just as easily be adopted with minor modifications to check the consistency of refactored methods written in different OOP languages or even different types of programming languages without departing from the scope of the present disclosure.

A peculiarity in Java is the equals( ) method. This method is implicitly defined in every Java class. By default, the equals( ) method does not compare objects based on their content or value, but based on their identity or the place they are stored in memory. For example, a class 'employee' may have two objects as follows—
   Object 1=John Doe
   Object 2=John Doe In this example, one would expect object1.equals(object2) to return true as they have the same value. However, because the function equals( ) compares the identity of the objects to determine whether they are the same object, it returns a false value because object 1 and object 2 are two distinct object identities. Accordingly, in the past, if consistency had to be checked for refactored methods in Java, developers had to write overrides in the code for each class/object so that the equals( ) method did not consider only the object identity but also the value of relevant properties. This was very burdensome on the developer and was prone to human error (e.g., a developer could forget to implement an equals( ) override before deploying the refactored method or miss a field in the equals( ) method). The consistency checking system 150 described herein does not require developers to write any overrides.

For the consistency checking system 150 to perform consistency check on refactored methods, developers need to perform certain actions. First, when a developer refactors a piece of code, the developer is required to create a consistency check FF to wrap around the original code and the refactored code. In one example, a developer may add the following consistency check FF code depicted in Table B in their code base—

TABLE B

Example consistency check FF code

Consistency Check
   .ConsistencyCheckControlledBy(new
   ConsistencyCheckFlag("my-ff"))
   .replacing(this::oldMethod)
   .whileComparingResults( )
   .withNewCode(this::newRefactoredMethod);

The developer can then setup variations for the "my-ff" FF using the FF system 130. In one example, a multivariate FF can be configured as depicted in FIG. 3A. In this example, the first variation of the FF 300 is set to execute the new refactored feature. In particular, the value of variation 1 is set to 'NEW' and the optional name of the variation is also set to 'NEW'. When this variation of the FF is executed, a consistency check test is not executed. Instead, the product platform 120 executes the refactored method and returns the results of the refactored method to the customer. The second variation is set to execute the consistency check test and return results from the new refactored method. In particular, the value of variation 2 is set to 'CHECK_RETURN_NEW' and the optional name of the variation is also set to the same value. When this variation of the FF is executed, the product platform 120 executes both the old method and the refactored method and provides the results of the old and new methods to the consistency checking system 150, but returns the results of the refactored method to the customer. The third variation is set to execute the consistency check test and return results from the old feature. In particular, the value of variation 3 is set to 'CHECK' and the optional name of the variation is also set to the same value. When this variation of the FF is executed, the product platform 120 executes both the old method and the refactored method and provides the results of these methods to the consistency checking system 150, but returns the results of the old method to the customer. Finally, the fourth variation is set to execute the old feature. In the example depicted in FIG. 3A, the value of variation 4 is set to 'OLD' and the optional name of the variation is also set to 'OLD'. When this variation of the FF is executed, a consistency check test is not executed. Instead, the product platform 120 executes the old method and returns the results of executing the old method to the customer.

It will be appreciated that these variations are just examples and the consistency check FF can be configured in any other suitable manner. For instance, the FF could be configured to include three variations. In this case, the second variation shown in FIG. 3A could be omitted such that the FF is configured to switch between the refactored feature, the consistency check test, and the old feature. In another example, the consistency check FF could be configured with just two variations. In this case, the first and second variations shown in FIG. 3A could be omitted such that the FF is configured to switch between the old feature and the consistency check test.

Further, at this stage, developers can set the rollout targets for the different variations of the FF. It will be appreciated that when the code is first refactored, the consistency check test can be rolled out to a small percentage (e.g., 10%) of the user base or just internal users, whereas the old feature may be activated for the remainder of the user base (e.g., 90%) or for all external users. FIG. 3B illustrates an example user interface 320 where the rollout percentage is set such that none of the customers are served the refactored feature or served the refactored feature after performing the consistency check test. For 10% of the customers, the consistency check FF is configured to execute the consistency check test described with reference to FIG. 4 and for 90% of the customer base, the FF is configured to execute the old feature.

When the refactored method is tested using the consistency check test for a period of time, the rollout targets can be changed until eventually (e.g., when all the inconsistencies have been fixed and the consistency check test does not reveal any further errors) the new refactored method may be rolled out to the entire customer base and the old method can be removed.

In addition to setting the consistency check FF, developers can optionally define parameters for the consistency check. For instance, in case the consistency checking system 150 is executing on the product platform 120, a developer may specify that the consistency check method be performed by a separate thread. In this case, when variation 2 or variation 3 of the FF depicted in FIG. 3B is executed, the consistency checking system 150 can start a new thread and perform the consistency checking test using the newly started thread. The advantage of doing this is that the consistency test can be performed in the background and the original operation of the product platform 120 remains unblocked.

Additionally, developers may be able to specify one or more paths in the data structures that should be ignored when comparing the old and refactored method results. This is useful in cases where the developer is aware beforehand that the values of certain objects will always be different when the old and new refactored methods are executed. One particular example of this is timestamp objects, which will almost always have different values when the old and refactored methods are executed. Developers can specify that such fields be ignored when the consistency check process is executed.

The refactored method can then pass through the standard stages of software development such as approval, building and deployment. Subsequently, each time the product platform 120 encounters a consistency check FF when executing an action, it may inspect the target rules of the FF and determine which variation of the feature is to be executed. If it is determined that the consistency check variation is to be executed, the product platform invokes the consistency checking system 150.

Figure 4:
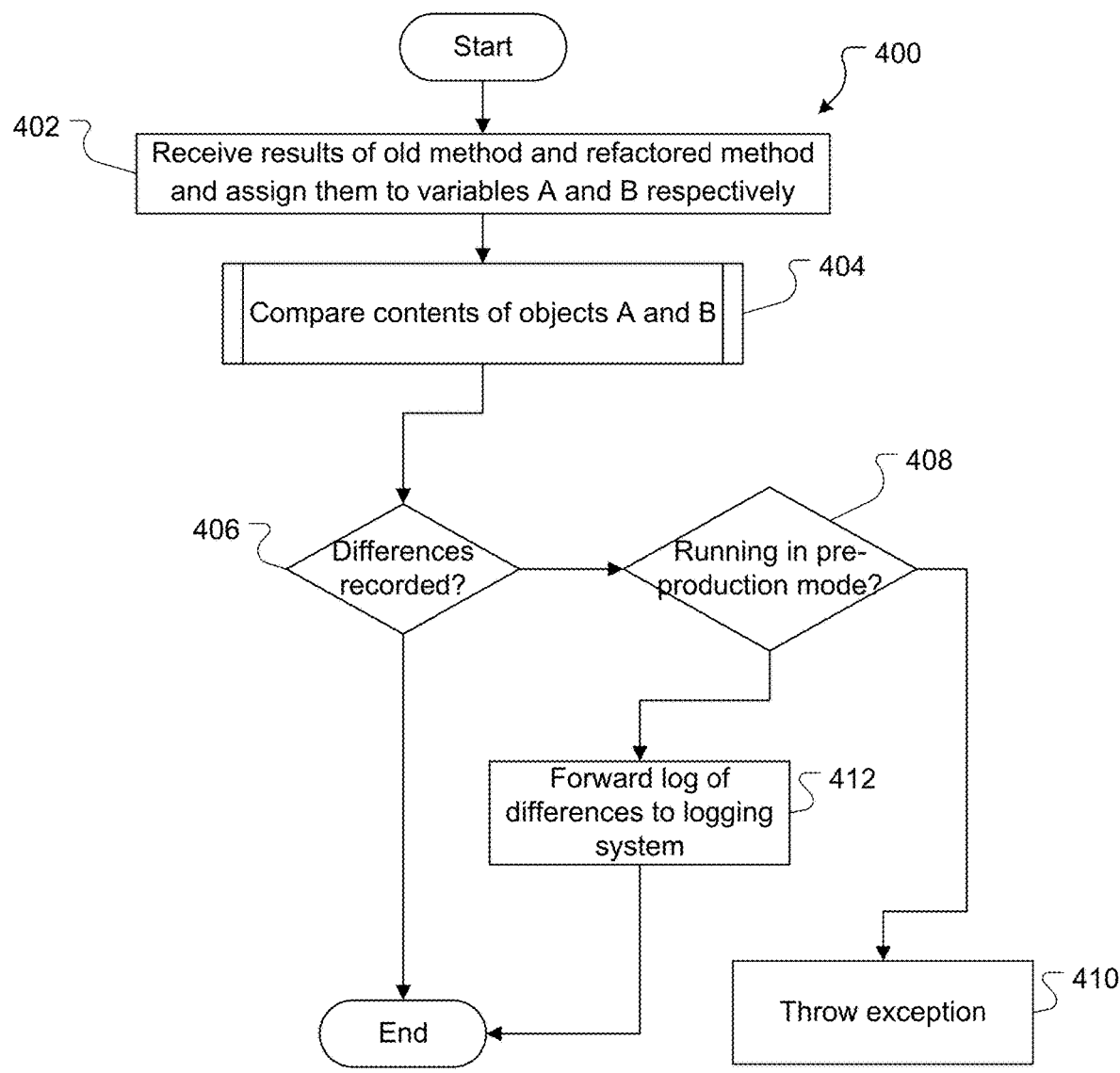
FIG. 4 is a flowchart illustrating an example high level method for checking consistency of a refactored method according to some aspects of the present disclosure.

FIG. 4 is a flowchart illustrating an example consistency check method 400 performed by the consistency checking system 150, in response to selection of the consistency check variation of a consistency check FF. This method is described with respect to a single software application and a single refactored method. However, it will be appreciated that in actual implementation, the method 400 can be performed on multiple refactored methods. The aim of the consistency check process is to identify differences between the results of the old and refactored methods as soon as possible. To do this, the consistency checking system 150 adopts an approach where progressively more complex comparisons are performed. Further, the consistency checking system 150 may be configured to end method 400 when a threshold number of differences are identified. In this manner, if a number of differences are identified early on (e.g., without having to perform complex comparisons), the consistency checking system 150 can quickly end the checking process and release computer resources that can be utilized for other processes. Further still, by limiting the number of differences identified and recorded, the consistency checking system 150 can provide a concise consistency check log to the logging system 130 which can be easily reviewed and understood by developers of the underlying refactored code.

The method 400 begins at step 402, where the consistency checking system 150 receives the results of the old method and the refactored method at runtime and assigns them to variables A and B respectively. In one embodiment, the product platform 120 may execute a feature/program/webpage and come across a consistency check FF in the code. If the conditions for executing a consistency check variation of the FF are met, the product platform 120 may be configured to execute the old method and the corresponding refactored method and communicate the results of executing the old and the refactored methods to the consistency checking system 150 as objects A and B. As described previously, the results may include one or more (simple or complex) objects.

Next, at step 404, the consistency checking system compares the objects A and B to determine if there are any differences in the two. This step is described in detail in process 500 with reference to FIG. 5.

Once the objects A and B are compared, the method proceeds to step 406 where it is determined whether any differences were recorded between the objects A and B during process 500. In one embodiment, the consistency checking system 150 may maintain a consistency check log of identified differences between the objects A and B and a counter of the number of differences identified. Each time a new difference is identified the consistency checking system 150 may add the difference to the consistency check log and increment the counter by 1. If the counter value exceeds a threshold value at any stage of the consistency process 500, the consistency checking system 150 may stop the process and forward the consistency check log to the logging system 150.

Returning to FIG. 4, if at step 406 it is determined that one or more differences were identified during the process 500 (e.g., because the consistency check log is not empty and/or the counter has a non-zero value), the method proceeds to step 408, where the consistency checking system 150 determines whether the old and refactored method are running in a pre-production mode. In certain embodiments, the consistency check test may be executed in a testing or staging mode (e.g., using a continuous integration system). If at step 408 it is determined that the consistency check test is executed in a pre-production mode (e.g., by checking a global variable "is_pre_production"), the method proceeds to step 410 where an exception is generated to fail the pre-production test that the consistency check test was a part of. Alternatively, if at step 408 it is determined that the consistency check test is not being executed in a pre-production environment, the method proceeds to step 412 where the consistency checking system 150 forwards a log of the differences recorded during process 500 to the logging system 130.

Alternatively, if at step 406 it is determined that no differences were identified during process 500 (e.g., because the consistency check log is empty and/or the counter has a zero value), the method 400 ends.

Figure 5:
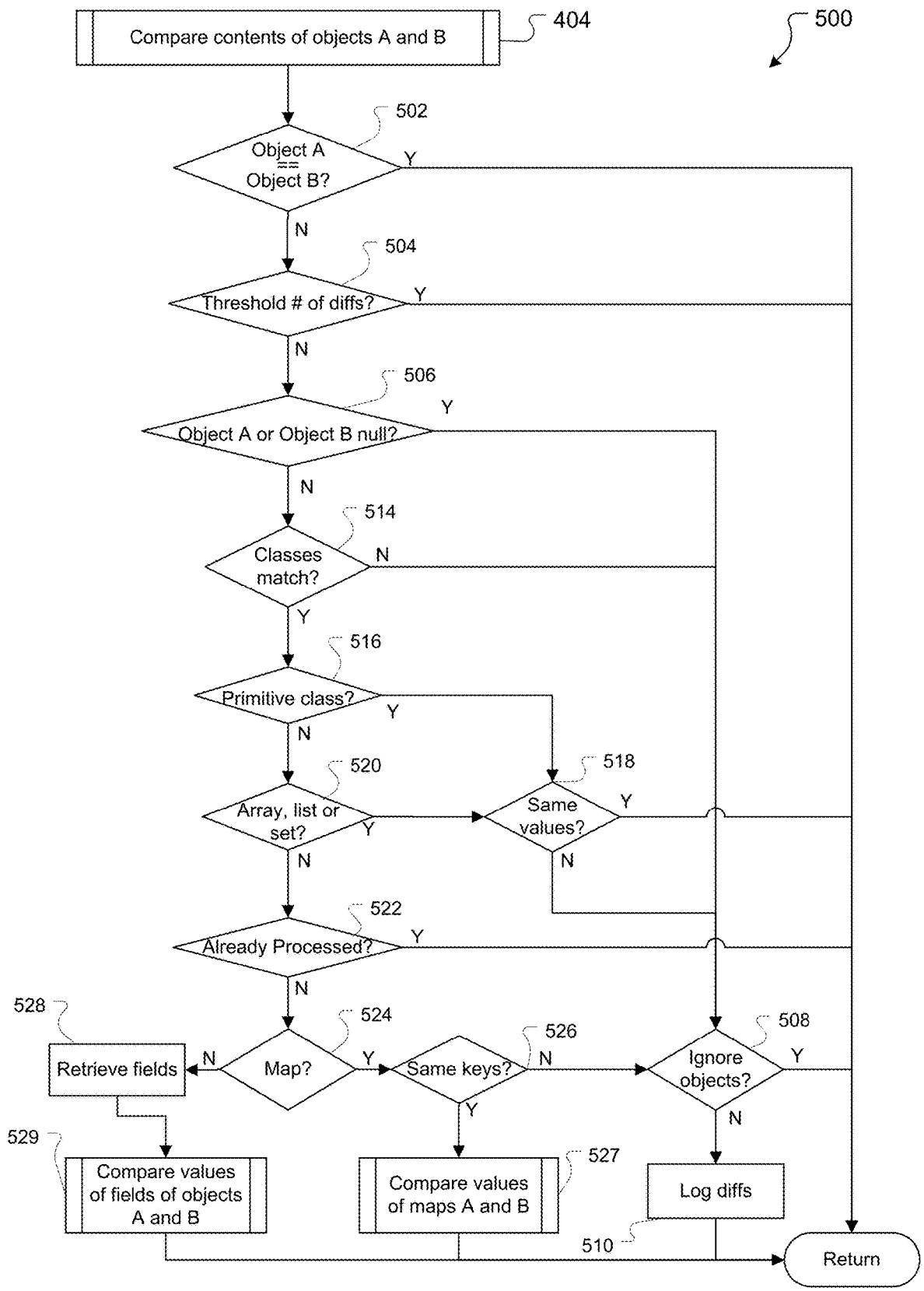
FIG. 5 is a flowchart illustrating an example method for comparing results of an old method with the refactored method of FIG. 4 according to some aspects of the present disclosure.

FIG. 5 is a flowchart illustrating a process 500 performed to complete step 404 of method 400 and in particular to recursively compare the result of the old method with the result of the new method. The method begins at step 502, where the consistency check system determines whether the returned objects A and B are equal. In certain embodiments, a simple equals( ) test is performed on the objects A and B to make this determination. In particular, the consistency checking system 150 determines whether the identity of an object A is the same as the identity of an object B. For example, if the identity of the object A is "object x" and of the object B is "object x", the consistency checking system 150 determines that the identities of the objects are the same at step 502 (and the results are equal). Alternatively, if the identity of the object A is "object x" and of the object B is "object y", the consistency checking system 150 determines that the identities of the objects is not the same at step 502 (and the results are not equal).

If at step 502, it is determined that the objects A and B are equal, the consistency checking system 150 determines that there are no differences in the objects A and B and process 500 ends. Alternatively, if at step 502, the consistency checking system 150 determines that the objects A and B are not equal, the method proceeds to step 504, where a determination is made if the number of differences identified between the objects A and B exceeds a threshold. As described previously, in one embodiment, the consistency checking system 150 maintains a consistency check log of identified differences between the objects A and B and a counter of the number of differences identified. Each time a new difference is identified, the consistency checking system 150 may add the difference to the consistency check log and increment the counter by 1.

If, at step 504, it is determined that the counter value exceeds a threshold value, method 500 ends. Alternatively, if at this step it is determined that the threshold number of differences has not been exceeded, the method 500 proceeds to step 506, where a determination is made whether the object identities of object A and the corresponding object B is not the same because either there is no object corresponding to object B in the corresponding position in the old data result or because there is no object corresponding to object A in the corresponding position in the refactored result (i.e., either object A or B is null). If at step 506 it is determined that either of the objects is null, the method proceeds to step 508, where the consistency checking system 150 determines whether the object being evaluated should be ignored.

As described previously, when refactoring a piece of code, developers may indicate that a particular path in the data structure is meant to be ignored (e.g., because the value of that object will generally be different in the old method and the refactored method). This can be done, e.g., by providing a list of paths to be ignored when invoking the consistency check system. At step 508, the consistency checking system 150 determines whether the result paths being evaluated should be ignored, e.g., by determining whether the list of paths to be ignored contains the currently examined path. If it is determined at this step that this specific path should be ignored, the method 500 ends. Alternatively, if the consistency checking system 150 determines that the object should not be ignored, the method proceeds to step 510 where the consistency checking system 150 logs the difference between the objects being compared (e.g., that either the object A or B is null—for example: "Consistency check 'testCheck' failed. Object A is null") and the method 500 ends.

The process 500 described so far is the process for checking whether objects A and B are the same or not based on a comparison of the identity of the objects. If, for the results being compared so far it is determined that corresponding objects exist but their identities are not the same, the consistency checking system 150 performs a deeper comparison step to identify the real cause of the differences (if any). This deeper process is described with reference to the next set of steps of FIG. 5.

At step 514, the classes for the objects A and B are retrieved. In one embodiment, the consistency checking system 150 may utilize a code reflection function to retrieve this information. Generally speaking, code reflection is a function which can inspect its own metadata to examine or modify its own behavior or structure at runtime. One example of reflection is JavaReflection® which offers an API to examine fields, methods, classes and interfaces of objects at runtime.

In some embodiments, the consistency checking system 150 can utilize Java Reflection to retrieve information about objects A and B, including, for example, the classes of the objects A and B.

If an object is to result in the same behavior after refactoring, the class of the object should remain the same as the class of the object before the refactoring. Accordingly, at step 514, the consistency checking system 150 determines whether the classes of the objects A or B are the same. This can be done by a simple comparison of the class identifiers of the two classes—e.g., A.getClass( ).equals(B.getClass( )).

If at step 514 it is determined that the classes are not the same, for example because the class of the object A is Boolean whereas the class of object B is String, the method proceeds to step 508 where the consistency checking system 150 determines whether the result path being evaluated should be ignored. If it is determined at this step that this specific result path should be ignored, the method 500 ends. Alternatively, if the consistency checking system 150 determines that the result path should not be ignored, the method proceeds to step 510 where the consistency checking system 150 logs the difference between the objects being compared (e.g., that the classes of the objects A or B do not match— Consistency check 'testCheck' failed. Unequal class: old "DeepObject" !=new "OtherDeepObject") and the method 500 ends.

Alternatively, if at step 514 it is determined that the classes are the same, the consistency checking system 150 delves one step deeper in the data structure of the results to determine if there are any other differences between the objects A and B. For instance, at step 516, the consistency checking system 150 determines whether the type of class of the compared results is of a primitive type.

Generally speaking, in Java and other such programming languages, classes can broadly be divided into two types— primitive and non-primitive classes. Primitive classes are the most basic types of classes available within programming languages. There are 8 primitive classes including Boolean, byte, char, short, int, long, float, and double. These types of classes serve as the building blocks of data manipulation in Java and typically serve only one purpose—i.e., containing simple values of a kind. Non-primitive (also known as reference classes) are more sophisticated. For instance objects in these types of classes do not store a value, but store a reference to that value. Non-primitive types of classes can include interface variables (such as maps or sets), or array variables or any other classes that extend the Object class.

Because primitive and non-primitive types of classes hold different things and different types of non-primitive classes hold different types of references, the same comparison tests cannot be utilized for all types of classes. Instead, based on the type of class identified at step 426, the consistency checking system employs different checks.

For example, if at step 516 it is determined that the class of objects A and B is a primitive class, the method proceeds to step 518, where it is determined whether the values of the objects A and B are the same. If the values of the compared objects is the same, the method 500 ends.

Alternatively, if the values of the objects A and B are determined to be unequal at step 518, the consistency checking system 150 infers that the objects A and B are different and the method proceeds to steps 508 and 510 (which are described previously). The error log added at this step may be, e.g., "Consistency check 'testCheck' failed. Unequal reference.dynamicField: old "X" !=new "YYYYY"".

Returning to step 516, if at this step it is determined that the class is not a primitive type of class, the method 500 proceeds to step 520 where the consistency checking system 150 determines whether the type of non-primitive class is an array, list or a set. For instance, if at step 520 the consistency checking system 150 identifies the non-primitive class to be an array, list or set, the method proceeds to step 518 where the consistency checking system 150 determines whether the values in the array, list or set A have the same values as the corresponding array, list or set B. In one example, the following method may be employed for this comparison— arrayA.equals(arrayB). If any differences are identified, the consistency checking system 150 determines if the objects that are identified as having unequal values are meant to be ignored at step 508. If the differences are not meant to be ignored, the method proceeds to step 510 where the differences are logged (e.g., as Consistency check 'testCheck' failed. Unequal array: old ["A","B","XXX"] !=new ["A", "B","YYY"]), the difference counter incremented, and the method 500 ends.

Otherwise, if no differences are identified between the values of the array, list or set result types, the method 500 ends.

Alternatively, if at step 520, it is determined that the class of the object is neither an array, list or a set, the method proceeds to step 522 where a determination is made whether the old result is already processed/checked. In some cases, the result may include a complex data structure, in which a first object refers to a second object and the second object refers back to the first object. In this case, while proceeding through the complex data structure, the consistency checking system may get stuck in a loop where it cycles between checking the first object and then the second object and then the first object again.

To prevent this, when a particular consistency check test commences, the consistency checking system 150 maintains a cache of the objects already examined in a test record. Each time it checks a new object at step 522, the consistency checking system 150 compares the identifier of the new object with the list of identifiers maintained in the test record. If the identifier already exists in the test record, the consistency checking system 150 infers that the object has already been examined and the method 500 ends. Alternatively, if at step 522 a determination is made that the identifier of the new object does not match the identifiers of any of the objects recorded in the test record, the consistency checking system 150 adds the identifier of the new object in the test record and proceeds to step 524 where a determination is made whether the class is a map.

Maps are interface objects that have multiple keys and each key has a corresponding value assigned. At step 526, the consistency checking system 150 retrieves the map keys from maps A and B.

Next, at step 526, the consistency checking system 150 compares the identified map keys from maps A and B to determine if they are the same. For example, the consistency checking system 150 may compare the number and/or identities of keys in the old result with the number and/or identities of keys in the refactored result. If the number of keys and/or identities of one or more of the keys are determined not to be the same at step 526, the method proceeds to step 508. Otherwise, if the same number of keys exist in the maps A and B and all the keys of the maps A and B match, the method proceeds to step 527 where the values of each of the keys in the maps A or B are matched to determine if any differences exist in the values corresponding to the keys.

Figure 6:
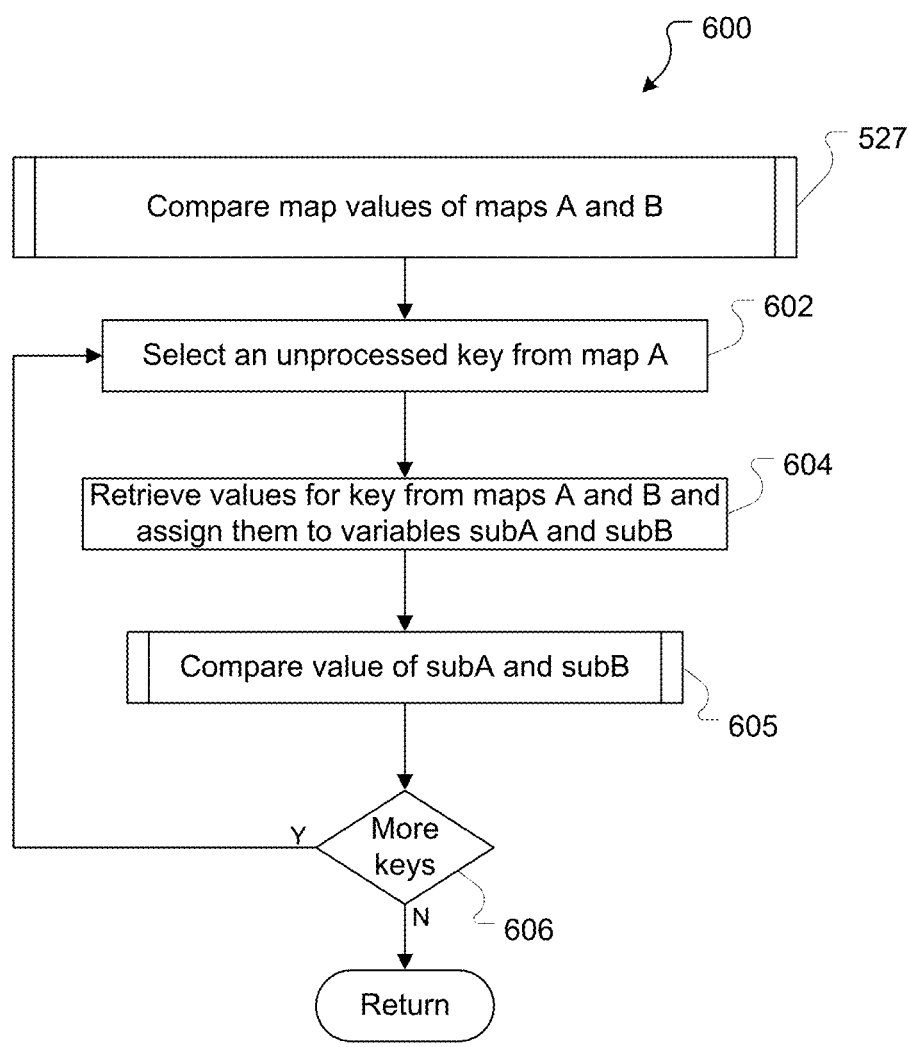
FIG. 6 is a flowchart illustrating an example method for comparing values of map keys for given objects according to some aspects of the present disclosure.

Step 527 includes a number of sub-steps, which are depicted in FIG. 6 as sub-process 600. Sub-process 600 commences at step 602 where a key of the map A is selected. For this key, at step 604, the corresponding values are retrieved from the maps A or B and assigned variables such as subA and subB. In one example, the values of the key in the maps A and B may be retrieved using the following commands— subA=A.get(key)
subB=B.get(key)

Next, at step 605, the retrieved values for that key are compared to determine if they match. This process for determining whether the values of a particular match is the same as the method step 404 and process 500—i.e., the consistency checking system 150 tries to compare these items (subA and subB) by following the same simple to complex comparisons described with respect to steps 502-529 of method 500.

Once this step 605 returns (e.g., at the end of process 500), the method proceeds to step 606, where the consistency check system 150 determines if all the keys have been inspected. If a key exists in the list of retrieved keys that is not yet examined, the method steps 602-606 are repeated.

On the other hand, if at step 606, the consistency checking system 150 determines that all the values corresponding to keys of the map A have been compared, the method 600 ends.

Returning to FIG. 5, if the step 527 (method 600) ends, then the method 500 ends as well.

On the other hand, if at step 524, it is determined that the old result is not a map, but some other type of class, the method 500 proceeds to step 528, where the consistency checking system 150 retrieves the fields of the objects A or B. In one example, Java reflection may be utilized to retrieve the field names. For instance, for the following class:

```
private static class DeepObject {
    String dynamicField;
}
``` the following command may be utilized to retrieve an array of field names and field classes for a given result—
DeepObject.class.getDeclaredFields( )
Which could result in the following output—

```
[{
name = "dynamicField"
type = {Class@327} "class java.lang.String"
}]
```

Figure 7:
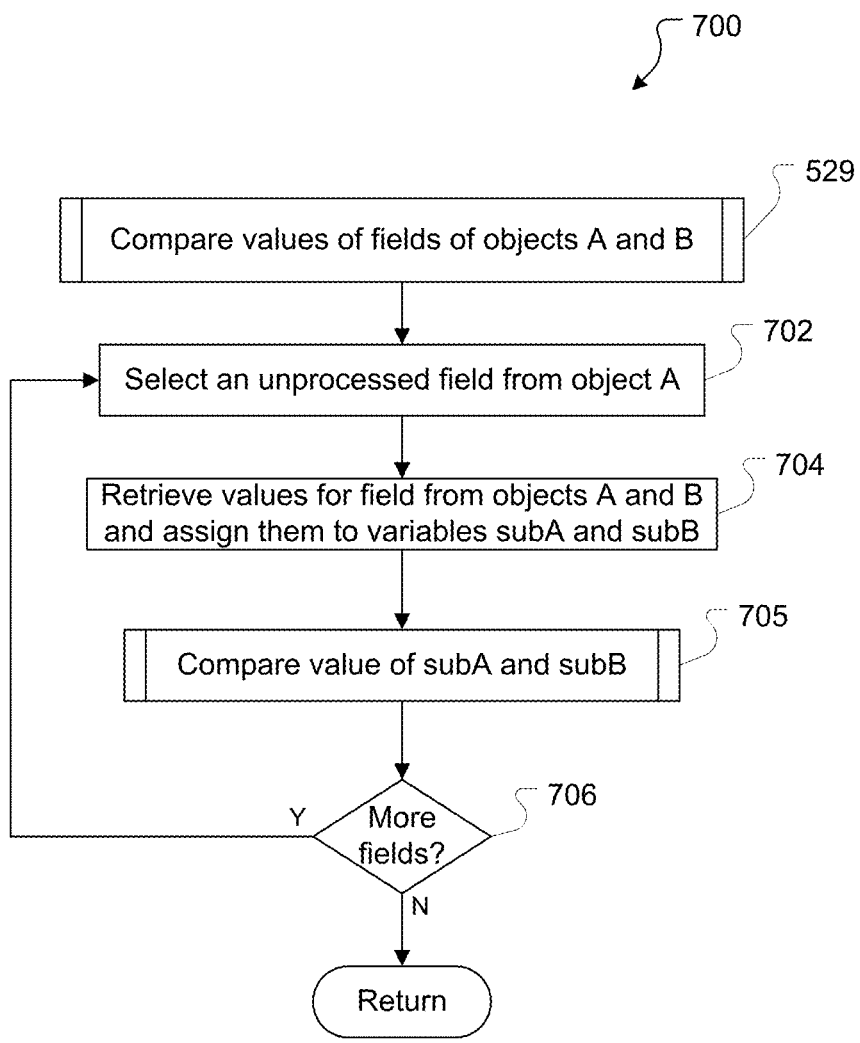
FIG. 7 is a flowchart illustrating an example method for comparing field values for given objects according to some aspects of the present disclosure.

Next, at step 529, the field values from the object A are compared with the field values from the object B to determine if any differences exist. Step 529 also includes a number of sub-steps, which are depicted in FIG. 7 as sub-process 700.

Sub-process 700 commences at step 702 where a field from the object A is selected. For this field, at step 704, the corresponding field values are retrieved from the objects A or B and assigned to some variables, e.g., variables subA and subB. In one example, the values of the objects A and B may be retrieved using the following commands—

```
subA = DeepObject.class.getDeclaredFields( )[0].get(A)
subB = DeepObject.class.getDeclaredFields( )[0].get(B)
```

Next, at step 705, the retrieved values of the given field are compared to determine if they match. This process for determining whether the values match is the same as the method step 404 and process 500—i.e., the consistency checking system 150 tries to compare these items by following the same simple to complex comparisons described with respect to steps 502-529 of method 500.

Once this step 705 returns (e.g., at the end of process 500), the method proceeds to step 706, where the consistency check system 150 determines if all the fields have been inspected. If there is a field that has not yet been examined, the method steps 702-706 are repeated.

On the other hand, if at step 706 the consistency checking system 150 determines that all the fields of the objects A and B have been compared, the method 700 ends.

Returning to FIG. 5, if the step 529 ends (method 700), the method 500 ends as well.

It will be appreciated that the processes depicted in FIGS. 4-7 describe one example method for determining the consistency of a refactored method and in particular, it is a recursive method that is implemented to compare objects at different levels of depth. In other examples, the one or more method steps may be rearranged, certain steps may be omitted and other steps may be added without departing from the scope of the present disclosure.

For example, FIGS. 4-7 illustrates comparison tests for maps, primitive object types, lists, arrays, etc. However, there may be other object types as well, such as sets, enums, etc. and after step 524 the consistency checking system may be configured to identify any type of non-primitive objects and execute customized comparison tests for those types of non-primitive object types.

Further, additional parameters for the identified object types may be tested. For example, in case the old and/or refactored results include complex data structures with multiple items, the consistency checking system 150 may also be configured to compare the sizes of the complex data structures before comparing the values of objects/items in these data structures. If the sizes are identified to be different, the consistency check test can end at that stage. This would prevent the need to retrieve values of the objects and iteratively compare these to identify differences.

Further still, in one embodiment, a developer may include one or more customized test methods within the consistency check test at the time of developing the refactored code. In such cases, the consistency checking system 150 may be configured to retrieve the one or more customized tests and perform these tests during the consistency check test.

Aspects of the present disclosure are directed to systems and methods for checking the consistency of refactored methods. In this disclosure, the phrases 'checking the consistency of a refactored method' and 'performing a consistency check test' are interchangeably used. Both these phrases mean the same thing.

It will be appreciated that the consistency check test disclosed herein is performed for refactored methods that have either no side-effects or have negligible side-effects (i.e. refactored methods that conform to the rules of functional programming). Otherwise, in case refactored methods have side-effects, if the refactored method is invoked along with the original method, it may have undesired consequences on the system.

In the foregoing specification, embodiments of the invention have been described with reference to numerous specific details that may vary from implementation to implementation. For example, in the foregoing specification, the logging system 130 is depicted as a separate system that is configured to receive event log data from the product platform 120 and store this data. However, in other embodiments, the logging system 130 may be omitted and the product platform 120 may directly save and store the FF and consistency check event log data in the product platform's data store 124. In this case, if the consistency checking system 150 is also executed on the product platform 120, method 400 can be executed within the product platform 120 itself. The sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using process steps. The functionality/processing of a given process step could potentially be performed in various different ways and by various different systems or system modules. Furthermore, a given process step could be divided into multiple steps and/or multiple steps could be combined into a single step and/or two or more of the steps can be performed in parallel. Furthermore, the order of the steps can be changed and one or more steps can be added or deleted without departing from the scope of the present disclosure. For example, steps to retrieve timer event logs for different environments and calculate performance regression for each environment may be added.

It will be understood that the embodiments disclosed and defined in this specification extends to alternative combinations of two or more of the individual features mentioned or evident from the text or drawings. These different combinations constitute various alternative aspects of the embodiments.

The invention claimed is:

1. A method for performing a consistency check test on a refactored method relative to an original method, the refactored method wrapped in a feature flag, the refactored method and the original method released to, and executable by, an end-user computer, the method comprising:
   receiving, at the end-user computer, an input that that triggers a call of the original method;
   in response to the input, executing by the end-user computer both the original method and the refactored method, the original method being compiled from original code and the refactored method being compiled from refactored code that is different from the original code;
   accessing by the end-user computer:
      a refactored result generated as a result of executing, the refactored method; and
      an original method result generated as a result of executing the original method;
   assigning the refactored result to a first object and assigning the original method result to a second object;
   comparing the first object with the second object to verify that the first object is equivalent to the second object;
   upon determining that the first object is not equivalent to the second object:
      logging differences between the first object and the second object in a log file;
      signaling a product platform that the refactored method is not equivalent to the original method; and
      providing the original method result as output in response to the call and disabling the feature flag associated with the refactored method; and
   upon determining that the first object and the second object are equivalent, providing the refactored result as output in response to the call.

2. The method of claim 1, wherein the method is performed in response to a consistency check feature flag being identified by the product platform while executing instructions, and the consistency check feature flag meeting a condition for executing the consistency check test.

3. The method of claim 1, wherein comparing the first object to the second object comprises:
   determining whether the first and second objects are stored in the same location in memory; and
   upon determining that the first and second objects are not stored in the same location, determining whether the value of the first object matches the value of the second object.

4. The method of claim 3, wherein comparing the first object to the second object comprises:

identifying a class of the first object and a class of the second object;
comparing the class of the first object with the class of the second object to determine if the classes match; and
upon determining that the classes of the first and second objects do not match, determining whether the first object or the second object is flagged to be ignored; and
upon determining that the first object or the second object is not flagged to be ignored, logging the class difference in the log file.

5. The method of claim 4, comprising:
upon determining that the classes of the first and second objects match, determining a class type of of each of the first object and the second object; and
in response determining that each class type is a primitive class, an array, a list, or a set:
  determining whether values of the first and second object match; and
  in response to determining that the values match, signaling that the first object and the second object are equivalent.

6. The method of claim 4, further comprising:
upon determining that the classes of the first and second objects match, determining the type of class; and
if the type of class is determined to be a map, retrieving one or more map keys from first object and the second object;
comparing the retrieved map keys from first object and the second object to determine if one or more pairs of the retrieved map keys match;
upon determining that one or more pairs of the retrieved map keys do not match, determining whether the one or more pairs of the retrieved map keys are flagged to be ignored and; and
upon determining that the one or more pairs of the retrieved map keys are not flagged to be ignored, logging the difference in the one or more pairs of the retrieved map keys in the log file and signaling that the first object and the second object are not equivalent.

7. The method of claim 6, further comprising:
upon determining that the one or more pairs of the retrieved map keys match, selecting an unprocessed key from the first object;
retrieving values for the selected key from the first object and the second object and assigning the value retrieved for the selected key from the first object to a first variable and assigning the value retrieved for the selected key from the second object to a second variable; and
comparing the first variable and the second variable to determine if the first variable and the second variable match; and
upon determining that the first variable and the second variable do not match, determining whether the first variable or the second variable is flagged to be ignored; and
upon determining that the first variable or the second variable is not flagged to be ignored, logging the difference in the first variable and the second variable in the log file signaling that the first object and the second object are not equivalent.

8. The method of claim 6, further comprising:
upon determining that the classes of the first and second objects match, determining the type of class; and
if the type of class is determined to not be a map, retrieving one or more fields from first object and the second object;
selecting a field from the first object;
retrieving values for the selected field from the first object and the second object and assigning the value retrieved for the selected field from the first object to a first variable and assigning the value retrieved for the selected field from the second object to a second variable; and
comparing the first variable and the second variable to determine if the first variable and the second variable match; and
upon determining that the first variable and the second variable do not match, determining whether the first variable or the second variable is flagged to be ignored; and
upon determining that the first variable or the second variable is not flagged to be ignored, logging the difference in the first variable and the second variable in the log file signaling that the first object and the second object are not equivalent.

9. A non-transitory machine readable medium comprising instructions for performing a consistency check test on a refactored method wrapped in a feature flag and released to end users, the instructions when executed by a processor, cause a computing device to:
receive an input that invokes a call to the refactored method;
execute, by the computing device, the refactored method;
obtain, in response to execution of the refactored method, a refactored result;
obtain, by the computing device by one of accessing a memory or executing an original method associated with the refactored method, an original method result;
assign the refactored result to a first object and assign the original method result to a second object;
compare the first object with the second object to determine whether the refactored result and the original method result are equivalent;
upon determining that the first object and the second object are not equivalent:
  disable the feature flag;
  signal a feature flag system that the feature flag has been disable;
  enable the original method for future calls; and
  provide as output in response to the call the original method result; and
upon determining that the first object and the second object are equivalent, providing the refactored result as output in response to the call.

10. The non-transitory machine readable medium of claim 9, further comprising instructions which when executed by the processor cause the computing device to:
determine whether the first and second objects are stored in the same location in memory; and
upon determining that the first and second objects are not stored in the same location, determine whether a first value associated with the first object matches a second value associated with the second object and in response to determining that the first value is equal to the second value, signal that the first object is equivalent to the second object.

11. The non-transitory machine readable medium of claim 10, further comprising instructions which when executed by the processor cause the computing device to:
identify a class of the first object and a class of the second object;
compare the class of the first object with the class of the second object to determine if the classes match; and upon determining that the classes of the first and second objects do not match, determine whether the first object or the second object is flagged to be ignored; and upon determining that the first object or the second object is not flagged to be ignored, log the class difference in a log file and signal that the first object is not equivalent to the second object.

12. The non-transitory machine readable medium of claim 11, further comprising instructions which when executed by the processor cause the computing device to:

upon determining that the classes of the first and second objects match, determine a classtype of both the first object and the second object; and if the class type of both the first object and the second object is determined to be a primitive class, an array, a list or a set, determine whether the first and second values match and, in response, signal that the first object is equivalent to the second object.

13. The non-transitory machine readable medium of claim 11, further comprising instructions which when executed by the processor cause the computing device to:

upon determining that the classes of the first and second objects match, determine the type of class; and if the type of class is determined to be a map, retrieve one or more map keys from first object and the second object;

compare the retrieved map keys from first object and the second object to determine if one or more pairs of the retrieved map keys match;

upon determining that one or more pairs of the retrieved map keys do not match, determine whether the one or more pairs of the retrieved map keys are flagged to be ignored; and upon determining that the one or more pairs of the retrieved map keys are not flagged to be ignored, log the difference in the one or more pairs of the retrieved map keys in the log file and, in response, signal that the first object is not equivalent to the second object.

14. The non-transitory machine readable medium of claim 13, further comprising instructions which when executed by the processor cause the computing device to:

upon determining that the one or more pairs of the retrieved map keys match, select an unprocessed key from the first object;

retrieve values for the selected key from the first object and the second object and assign the value retrieved for the selected key from the first object to a first variable and assign the value retrieved for the selected key from the second object to a second variable; and compare the first variable and the second variable to determine if the first variable and the second variable match; and upon determining that the first variable and the second variable do not match, determine whether the first variable or the second variable is flagged to be ignored; and upon determining that the first variable or the second variable is not flagged to be ignored, log the difference in the first variable and the second variable in the log file and, in response, signal that the first object is not equivalent to the second object.

15. The non-transitory machine readable medium of claim 13, further comprising instructions which when executed by the processor cause the computing device to:

upon determining that the classes of the first and second objects match, determine the type of class; and if the type of class is determined to not be a map, retrieve one or more fields from first object and the second object;

select a field from the first object;

retrieve values for the selected field from the first object and the second object and assign the value retrieved for the selected field from the first object to a first variable and assign the value retrieved for the selected field from the second object to a second variable; and compare the first variable and the second variable to determine if the first variable and the second variable match; and upon determining that the first variable and the second variable do not match, determine whether the first variable or the second variable is flagged to be ignored; and upon determining that the first variable or the second variable is not flagged to be ignored, log the difference in the first variable and the second variable in the log file and, in response, signal that the first object is not equivalent to the second object.

* * * * *